US005557833A

United States Patent [19]

Pool

[11] Patent Number: 5,557,833
[45] Date of Patent: Sep. 24, 1996

[54] PULLER DEVICE

[75] Inventor: James L. Pool, Clarinda, Iowa

[73] Assignee: Lisle Corporation, Clarinda, Iowa

[21] Appl. No.: 392,144

[22] Filed: Feb. 22, 1995

[51] Int. Cl.[6] ........ B23P 19/04
[52] U.S. Cl. ........ 29/261
[58] Field of Search ........ 29/261, 262, 246, 29/260, 259

[56] References Cited

U.S. PATENT DOCUMENTS

| | | | |
|---|---|---|---|
| 1,446,918 | 2/1923 | Mielke | 29/261 |
| 1,682,956 | 9/1928 | Dawson et al. | 29/261 |
| 1,732,696 | 10/1929 | Ridenour | 29/261 |
| 1,996,967 | 4/1935 | Kratky | 29/261 |
| 4,007,535 | 2/1977 | Brandt et al. | 29/261 |
| 5,224,254 | 7/1993 | McPeak et al. | 29/261 |

OTHER PUBLICATIONS

Posi Lock Puller, Inc. Catalog, 1989.
Old Forge Puller Catalog, pp. 25–34, pp. 31–41, Oct. 1995.
OTC Products Catalog, pp. D–47–D–60, pp. 95–108, 1995.
Cornwell Puller Catalog, pp. 158–162, 1980.
Snap On Tools Catalog, pp. 250–257, pp. 272–277, 1995.
Matco Tools Catalog, pp. 341–345, 1992.
Mac Tools Catalog, pp. 235–243, Jan. 1995.

*Primary Examiner*—Robert C. Watson
*Attorney, Agent, or Firm*—Banner & Allegretti, Ltd.

[57] ABSTRACT

A reversible pulling apparatus including multiple reversible jaw members pivotally attached to a first yoke having a pressure screw extending therethrough. A second yoke is axially extendable from the first yoke and includes the cam members coactive with a cam surface defined at the outside ends of the jaw members to positively engage the jaw members at a fixed diameter of the part being subjected to an inside or outside pull.

11 Claims, 2 Drawing Sheets

PULLER DEVICE

BACKGROUND OF THE INVENTION

This invention relates to a pulling device and, more specifically, to a device for pulling an object or item such as a pulley or wheel from a shaft or alternatively for pulling an item such as a bearing or race from its housing. The puller is, thus, reversible and may effect an inside pull or an outside pull.

Repair of automobiles, machinery and other similar mechanical devices often requires utilization of special tools for the disassembly of the component parts of the device being repaired. Among the tools which are often used for such disassembly are those which are termed a puller or pulling device. For example, when removing a steering wheel, pulleys, bearings, hubs, gears and the like, devices known as pullers are often used.

A myriad of types of pullers are available. Often the pulling devices are special purpose devices which are designed to provide for what is known as an outside pull. In an outside pull, various clamping arms grip around the outside of an item, such as a pulley, and are then utilized to pull that device off of a shaft or the like. An inside pull is an alternative procedure that is often used and is effected by means of arms which have gripping ends that extend radially outwardly so as to engage the inside surface of an annular item such as a bushing or bearing for removal from a housing or sleeve, for example.

Prior art pulling devices are typically adjustable to enable pulling or removal of items having various inside or outside diameters. Also, some prior art devices are designed to permit the same device to effect both an inside as well as an outside pull. Such devices are thus reversible.

There are various patents related to such devices including U.S. Pat. No. 4,007,535 which discloses a pulling device wherein the pulling arms, once positioned around an item, are locked into that position so that they cannot slip from the item which is being pulled. This is a safety feature which is desirable inasmuch as operation of a pulling device preferably occurs in a manner whereby the pulling arms will not slip. Perhaps, in the future, governmental regulation may require that there be such safety features incorporated in all pulling devices.

Thus, there has developed an increased need for pulling devices which are flexible and may be used not only for inside pulls but also for outside pulls upon items of varying diameter. Also such a pulling mechanism may desirably be locked into a specific diameter in either the inside or outside pull position. Seeking such a construction has led to the development of the present invention.

SUMMARY OF THE INVENTION

Briefly, the present invention comprises a mechanical apparatus or device which is designed to effect either an inside pull upon an item mounted within a member or an outside pull upon an item mounted on a shaft. The apparatus is reversible between inside and outside pulling configurations. The apparatus is also constructed to ensure that the pulling arms are locked in position to prevent slippage from the item being pulled during the pulling operation whether the apparatus is in the inside or outside pull configuration. The apparatus includes, at least, first and second reversible pulling jaw members. The jaw members each have a first link which terminates with a gripping end. A pivot opening is defined in the first link. A second link extends from the pivot opening away and from the gripping end. A jaw support yoke has radially extending arms each adapted to pivotally receive a jaw member. The yoke includes a centerline axial bore which receives a pressure screw extending therethrough toward the gripping ends. The pressure screw may be rotated to effect the pulling operation of the apparatus.

A cam member carriage, aligned generally concentrically with the jaw support yoke, includes a centerline axial bore that receives an annular spacing screw. The annular spacing screw is threadably attached to the carriage and is rotatably attached to the jaw support yoke so that the screw may be rotated and thereby effect a change in the spacing between the carriage and the jaw support yoke. The carriage includes cam followers that simultaneously coact with the second links. The jaw members are reversibly positioned so that the carriage cam followers will coact with cam surfaces defined by the second links. Whereby, when the spacing of the yoke and the carriage are adjusted, the jaw members pivot toward or away from each other to define a fixed diameter for inside or outside gripping of some item. The pressure screw may then be rotated to transport the entire assembly and thus effect a pull.

Thus, it is an object of the invention to provide an improved puller capable of making an inside or an outside pull which is reversible between the inside and outside configuration for pulling.

It is a further object of the invention to provide an apparatus for effecting either an inside or an outside pull wherein the device may be adjusted to accommodate a wide range of diameters of devices being pulled and further wherein the gripping arms which are adjusted to a specific diameter are maintained in that position in a positive essentially locked condition.

Yet another object of the invention is to provide an improved puller which is reversible and can be easily reversed merely by reversing the pulling arms to thereby effect a change from an inside pull to an outside pull or vice versa without changing the component parts of the pulling device.

Yet another object of the invention is to provide an economical and easy to manufacture pulling device which enables pulling a wide range of items of various size.

These and other objects, advantages and features of the invention will be set forth in the detailed description which follows.

BRIEF DESCRIPTION OF THE DRAWING

In the detailed description which follows, reference will be made to the drawing comprised of the following figures.

A DESCRIPTION OF THE PREFERRED EMBODIMENT

Figure 1:
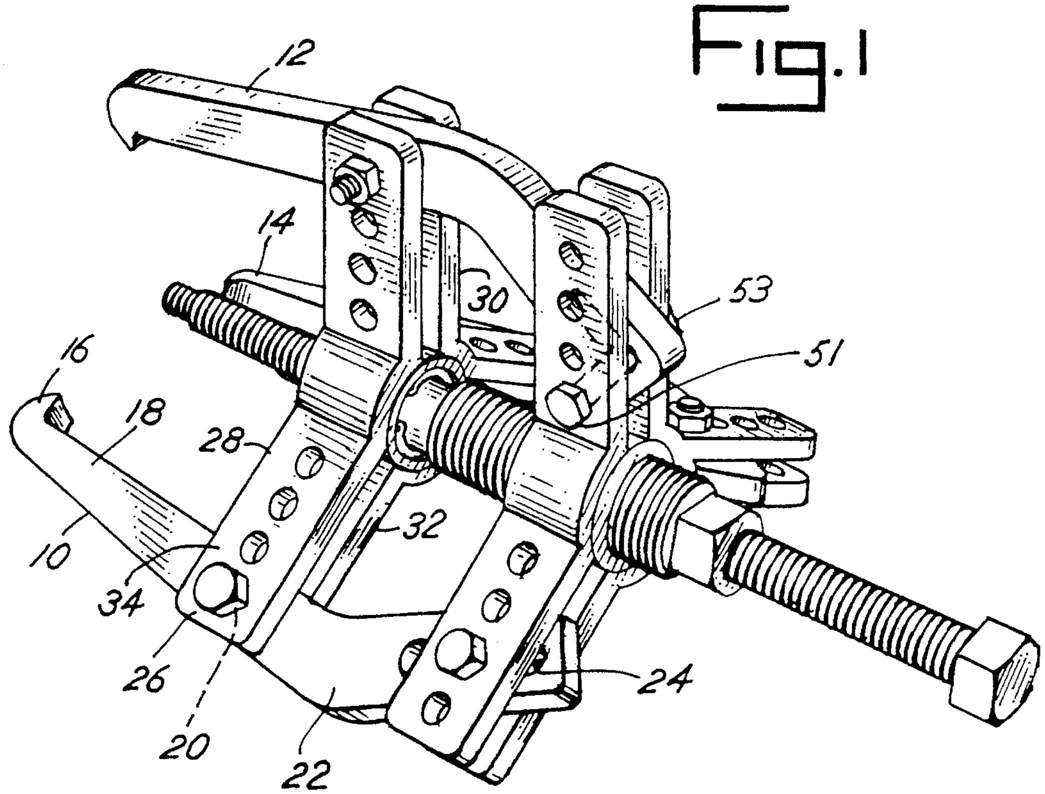
FIG. 1 is an isometric view of a preferred embodiment of the improved pulling device of the invention.
Figure 2:
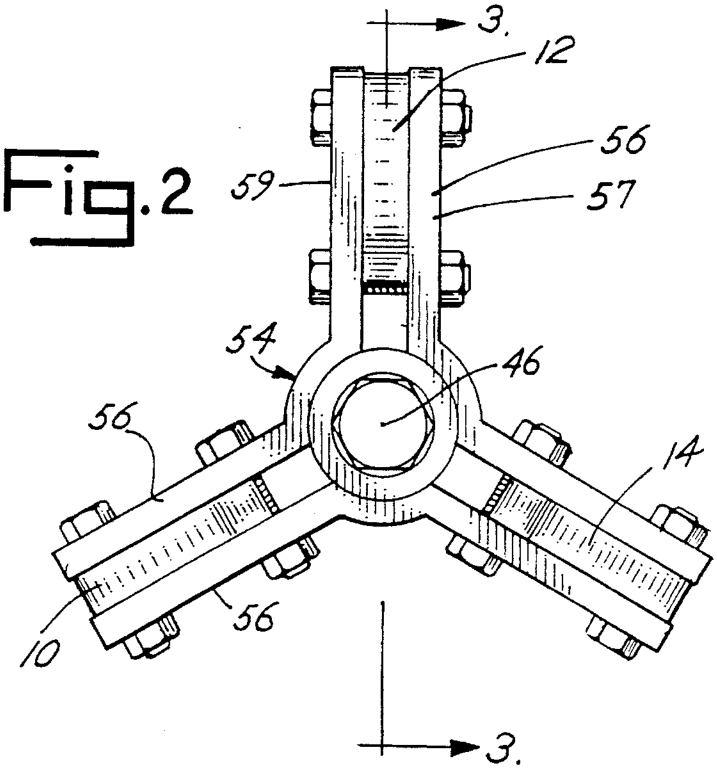
FIG. 2 is an view of the pulling device of FIG. 1.

FIG. 1 is an isometric view of the apparatus of the invention. The embodiment depicted includes first, second and third pulling jaw members 10, 12 and 14. Each of the jaw members 10, 12 and 14 is substantially identical in construction, thus, facilitating the ease of manufacture of the jaw members 10, 12 and 14. Thus, referring to jaw member 10, the jaw member 10 includes a gripping end 16 which comprises or defines a lip or tooth for gripping items such as a wheel, pulley or the like. The gripping end 16 connects with a first link 18 which is an elongated run with a pivot opening 20 opposite the gripping end 16. A second integral link 22 extends from the first link 18 in generally the opposite direction from the gripping end 16. The second link 22 forms a generally obtuse included angle with the first link 18. The second link 22 includes an elongated slot 24 which extends in a generally straight line in the second link 22. The slot 24 may be inclined with respect to a straight line defined by the first link 18 typically at a forty-five (45°) degree angle although other angles of inclination are possible. The slot 24 thus defines a cam follower as will be appreciated from the following description.

Each of the arms 10, 12 and 14 has substantially the identical construction. The arms 10, 12 and 14 are each separately and pivotally connected to a jaw support yoke 26. In the construction depicted, the yoke 26 is comprised of three substantially identical yoke forming members 28, 30 and 32 which include outwardly extending arms, for example, arm 34 of member 28. The jaw support yoke 26 also includes a centerline, axial, cylindrical bore member 36 upon which the yoke forming members 28, 30, 32 are mounted to define three (3) pairs of spaced arms 34, each pair adapted to pivotally receive an arm 10, 12 or 14. Bore member 36 has a threaded passage 38 therethrough adapted to receive a threaded pressure screw 40. Bore member 36 also includes a counterbore 42 adapted to rotatably receive a spacing screw 44 as described in greater detail below.

The jaw support yoke 26 generally defines a centerline axis 46 which is the rotational axis for the threaded pressure screw 40 and about which all the component members of the puller are concentrically arranged. Each arm 34 includes a series of passages or holes 48 which are arranged at increasing radial distances from the axis 46. A nut 52 and bolt 50 define a pivot axis or a pin for attaching and pivotally retaining arm 12, for example, in one pair of the openings 48 of yoke 26. In this manner, the arm 12 is rotatably positioned at a fixed radial distance from the axis 46 on the yoke 26. That radial distance may be adjusted depending upon the size of the item which is to be pulled using the apparatus of the invention and whether the pull will be an inside pull or an outside pull.

A cam member carriage yoke 54 is fabricated from members 56 (which in the embodiment shown are substantially identical to the members 28, 30 and 32). The carriage yoke 54 is attached to and incorporates an annular, center ring 58 which is threaded on the inside and coacts with the outside threaded surface of the spacing screw 44. The spacing screw 44 includes a flange end 60 which fits into the counterbore 42 of member 36 and is retained therein by a retaining ring 62. In this manner, the spacing screw 44 may be freely rotated about the axis 46 as it is retained within the counterbore 42. Inasmuch as the spacing screw 44 is threadably attached to the cylindrical ring 58, the carriage yoke 54 may be adjustably spaced in an axial direction from the yoke 26.

The spacing screw 44 comprises a hollow cylindrical member with axial passage 68 which receives the pressure screw 40. The pressure screw 40 may thus be rotated by engagement with its hexagonal head 66. However, when it is rotated, the pressure screw 40 rotates freely within the internal cylindrical passage 68 of the spacing screw 44. The spacing screw 44 also includes an outer hexagonal end 70 which may be engaged with a wrench to thereby effect operation of the spacing screw 44 to control separation of the carriage 54 from the yoke 26.

Figure 3:
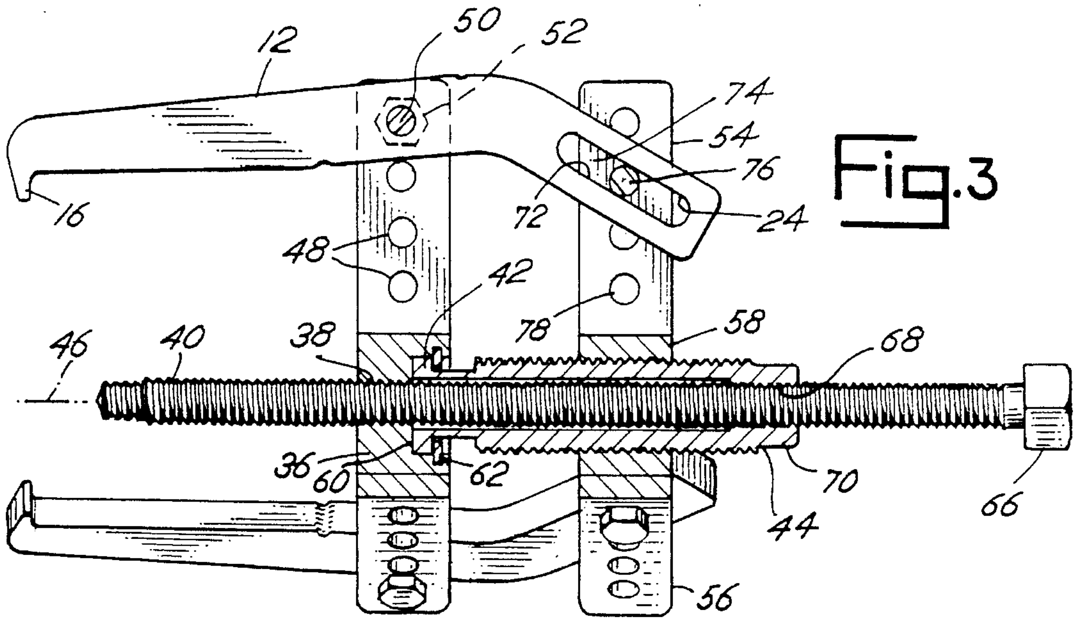
FIG. 3 is a side, cross-sectional view of the device of FIG. 2 taken along the line 3—3.

Each of the arms 10, 12 and 14, and more particularly the second links 22 thereof, includes an elongated slot 24 as more completely depicted in FIG. 3. The slot 24, as previously mentioned, defines a cam surface on opposite, parallel, elongate sides of the slot 24. Thus, the slot 24 has an inside surface 72 and an outside surface 74 which define follower surfaces. These follower surfaces 72, 74 coact with a pin 76 which is inserted through pairs of openings 78 in associated pairs of arms 57, 59 of members 56 forming the carriage yoke 54. The pin 76, thus, may be a nut 51 and bolt 53 combination similar to the nut 50 and bolt 52 associated with the support yoke 26. The pin 76 thus defines a cam which is guided by the follower surfaces 72 and 74. Pairs of arms 57, 59 of members 56 forming the carriage yoke 54 coact to support a pin 76 that interacts with each jaw member 10, 12, 14 and more particularly the surfaces 72, 74 of slot 24 thereof.

It is noted that the surfaces 72, 74 of slot 24 are inclined, as previously described, at an angle of approximately forty-five (45°) degrees with respect to the first link 18 (i.e., a line from end 16 to opening 20). Various other angles, however, may be defined by the slot 24. Additionally, various shapes of slot 24 may be adopted, such as an arcuate shape or a sinusoidal shape or some other linear or nonlinear shape. Nonetheless, the preferred embodiment is a slot with generally straight line surfaces 72, 74 such as depicted in FIG. 3.

Figure 4:
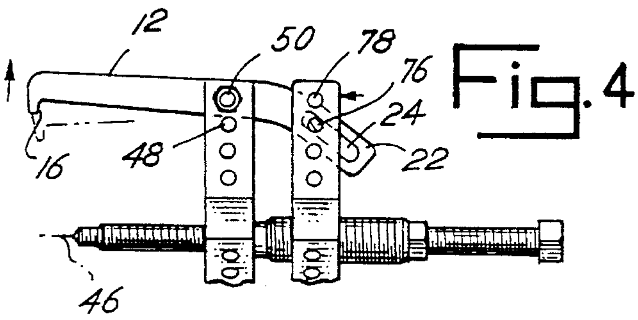
FIG. 4 is a partial side view of the pulling device of the invention arranged for an outside pull.
Figure 5:
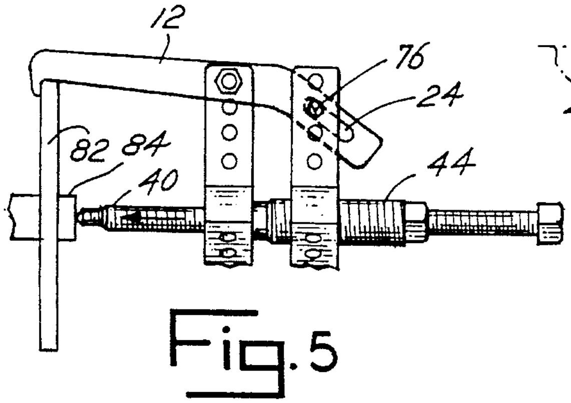
FIG. 5 is a partial side view similar to FIG. 4 wherein the device has been positioned on an item for an outside pull.
Figure 6:
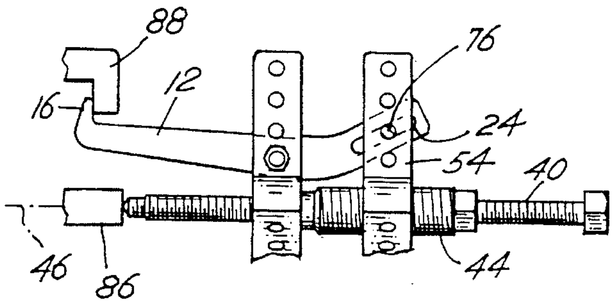
FIG. 6 is a partial side view wherein the pulling arms of the device have been arranged for an inside pull.

FIGS. 4 through 6 illustrate the operation of the puller of the invention both as an outside puller and an inside puller. FIGS. 4 and 5 illustrate the construction as an outside puller. In this configuration, the arms, such as arm 12, are arranged with the gripping end 16 pointed radially inward toward the axis 46. Each arm 10, 12 and 14 is positioned to pivot about a pin 50 in pairs of the selected openings 48. Additionally, a pin 76 through pairs of selected openings 78 in yoke arms 57, 59 fits through the slot 24 in the second link 22. Each of the arms 10, 12 and 14 is engaged and coacts with yokes 26, 54 in this fashion. The selection of the openings 48 and 78 which define pin axes depends upon the diameter of the item which is to be pulled and whether the pull is an inside or an outside pull. Thus, referring to FIG. 5, a plate 82 has a diameter which effectively determines the choice of the openings 48 and 78.

In operation after selection of the appropriate openings and assembly of the puller, the pressure screw 40 is positioned against a shaft 84 or fixed member. The spacing screw 44 is then adjusted to thereby cause ends 16 of the arm pulling jaw members 10, 12 and 14 to fit over the edge of the plate 82. This is accomplished by interaction of the pin or cam 76 in the follower slot 24. Thus, by adjusting the spacing of the yokes 26 and 54, the puller arms 10, 12 and 14 are positioned to commence the pulling operation. Thereafter, the pressure screw 40 is threaded into the yoke 54 causing the entire assembly to be transported to the right in FIG. 5 thereby effectively pulling the plate 82 from the shaft 84.

The descriptions of FIGS. 4 and 5 are particularly relevant to an outside pull. FIG. 6 illustrates the configuration of the component parts of the puller when effecting an inside pull. In this configuration, a fixed element or center shaft 86 coacts with the pressure screw 40. The reversible pulling jaw members 10, 12 and 14 are, in fact, reversed by removing the pins 50, reversing the jaw members 10, 12 and 14 and then reinserting the pins 50 through appropriate openings 48 so that the gripping end 16 projects outwardly and is positioned to coact with an item 88 which is to be pulled. The item 88 to be pulled may be a bearing for example. In this reverse or inside pull configuration, the slot 24 is likewise reversed in position and an appropriate pin 76 is fitted through appropriate openings 78 in the carriage yoke 54. Again, the spacing screw 44 is operated to drive the pin 76 in slot 24 to thereby spread the jaw members 10, 12 and 14 by effectively axially spacing the yokes 26 and 54. The jaws 10, 12 and 14 are thus tightly held in their position during the pulling operation. Next, the pressure screw 40 is rotated about its rotation axis 46 against the fixed shaft 86. This effects movement of the assembly to the right in FIG. 6 to effect the pulling operation.

The puller construction described is reversible to provide not only an inside and outside pull, but also to provide that the reversible pulling jaw members 10, 12 and 14 are, in fact, tightly positioned and, in effect, locked into a position of engagement with the item to be pulled so that the jaw members 10, 12 and 14 will not become disengaged during the pulling operation. The coaction of the pin 76 with an appropriate surfaces 72, 74 of the slot 24 serves to positively engage the jaw members 10, 12 and 14 and maintain those jaw members 10, 12 and 14 at a fixed diameter. By utilizing various combinations of openings or passages 48 and 78 in the respective yokes 26 and 54, it is possible to provide a wide range of inside and outside pulls which may be executed by the construction of the invention.

It should be noted that there are numerous alternative constructions which are deemed to be within the scope and meaning of the claims for the invention. For example, two or more jaw members may be utilized. The invention is not to be limited to three jaw members. Additionally, the radial extent of the yokes 26 and 54 may be varied as well as the pattern of passages or openings 48, 78 therein may also be varied. Additionally, certain component parts may be reversed or modified. For example, the second link 22 may have the outside planar surfaces thereof serve as followers, and a pair of pins on opposite sides of the followers through two spaced pairs of openings 78 in the arms of the carriage 54 may serve as the cam to positively retain the arms 10, 12 and 14. The slot 24 may be closed at both ends as depicted in the preferred embodiment. Alternatively, the slot 24 may be open at the outside end of the second link 22. In addition, supplemental springs may be utilized to engage and hold the arms 10, 12 and 14 in position. That is, a coil spring may be looped over the links 22 or positioned to bias the links 22 toward the axis 46. Also a spring may be used to connect each link 22 to yoke 54.

Thus, while there has been set forth a preferred embodiment of the invention, it is to be understood that the invention is to be limited only by the following claims and their equivalents.

What is claimed is:

1. Apparatus for effecting either an inside pull of an item from a housing or an outside pull of an item from a shaft, said apparatus being reversible between a configuration to effect an inside pull and an outside pull, said apparatus comprising, in combination:

at least first and second reversible, integral pulling jaw members, said jaw members each having a gripping end, a first link extending from the gripping end to a pivot and a second integral link extending from the pivot away from the gripping end;

a jaw support yoke having a centerline axial bore with a centerline axis and a plurality of radially extending arms, each of said arms including a pivot connection for pivotally connecting with one of the jaw members, said jaw members having aligned gripping ends;

a pressure screw extending through the axial bore of the yoke toward the gripping ends, and threadably attached to the jaw support yoke;

a cam member carriage having a centerline axial bore concentric with the yoke bore and including a plurality of radially extending arms;

an annular spacing screw in the cam member carriage bore, said spacing screw axially movable with respect to the cam member carriage bore, said spacing screw threadably attached to the cam member carriage, said pressure screw concentric with the spacing screw, said annular spacing screw rotatably attached to the jaw support yoke whereby the axial spacing of the yoke and carriage is adjustable by threadably adjusting the annular spacing screw;

said second link defining inside and outside cam surfaces, said carriage arms defining inside and outside cam followers coacting with the cam surfaces whereby when the axial spacing of the yoke and carriage is adjusted, the second link cam surfaces coact with the carriage followers to effect pivoting of the jaw members toward or away from each other for inside or outside gripping of the item and;

said pressure screw being rotatable to engage a surface and thereby simultaneously transport the yoke, carriage and jaws to effect a pull.

2. The apparatus of claim 1 wherein the cam surfaces are defined by a slot in the second link of each arm and the follower is defined by a pin from the carriage arm through the slot.

3. The apparatus of claim 2 wherein the radial distance of the pin from the centerline axis is adjustable.

4. The apparatus of claim 2 wherein the slot defines an obtuse angle with the first link.

5. The apparatus of claim 2 wherein the slot is closed at each end.

6. The apparatus of claim 1 wherein the radial distance of the jaw members pivot connection from the centerline axis is adjustable.

7. The apparatus of claim 1 wherein the radial distance of the cam followers from the centerline axis is adjustable.

8. The apparatus of claim 6 wherein the jaw members pivot connection comprise a pivot pin through one of a series of radially spaced openings in the jaw support yoke.

9. The apparatus of claim 7 wherein the cam followers comprise a pivot pin through one of a series of radially spaced openings in the cam member radially extending arms.

10. The apparatus of claim 1 wherein the pivot connection and cam follower are removable to permit inversion of the jaw members for conversion of the puller between an inside pull and an outside pull apparatus.

11. The apparatus of claim 1 wherein the radially extending arms are comprised of spaced, parallel pairs of arms with a jaw member between each set of pairs of arms.

* * * * *